(12) United States Patent
Blanarik et al.

(10) Patent No.: US 10,279,928 B2
(45) Date of Patent: May 7, 2019

(54) DELTA OFFSET BASED SURFACE MODELING

(71) Applicant: The Boeing Company, Chicago, IL (US)

(72) Inventors: Trevor C. Blanarik, Seattle, WA (US); Joshua M. Stengel, Redmond, WA (US); Steven M. Dixon, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 727 days.

(21) Appl. No.: 14/836,847

(22) Filed: Aug. 26, 2015

(65) Prior Publication Data
US 2017/0057665 A1    Mar. 2, 2017

(51) Int. Cl.
| | | |
|---|---|---|
| *G06F 17/50* | (2006.01) | |
| *B64F 5/00* | (2017.01) | |
| *B64C 1/00* | (2006.01) | |
| *B29C 51/14* | (2006.01) | |
| *F01D 5/28* | (2006.01) | |

(52) U.S. Cl.
CPC ............. *B64F 5/00* (2013.01); *G06F 17/50* (2013.01); *G06F 17/5086* (2013.01); *B29C 51/14* (2013.01); *B64C 2001/0072* (2013.01); *F01D 5/282* (2013.01); *F05D 2300/603* (2013.01); *G06F 17/5009* (2013.01); *G06F 2217/12* (2013.01); *G06F 2217/44* (2013.01)

(58) Field of Classification Search
None
See application file for complete search history.

(56) References Cited

U.S. PATENT DOCUMENTS

| | | | |
|---|---|---|---|
| 4,272,577 A | * | 6/1981 | Lyng .................... A63C 5/0428 264/108 |
| 4,849,913 A | | 7/1989 | Ward et al. |
| 4,945,488 A | | 7/1990 | Carver et al. |
| 5,006,990 A | | 4/1991 | Ward et al. |

(Continued)

FOREIGN PATENT DOCUMENTS

WO    WO 2005 062258    7/2005

OTHER PUBLICATIONS

Mcneel, Robert. "UnrollSrf Rhino 3-D modeling", Sep. 17, 2015, 6 pages. Accessible at http://docs.mcneel.com/rhino/5/help/en-us/commands/unrollsrf.htm.*

(Continued)

*Primary Examiner* — Kibrom K Gebresilassie
(74) *Attorney, Agent, or Firm* — Toler Law Group, PC

(57) ABSTRACT

A method includes receiving a reference design at a computing device. The reference design includes first geometrical information associated with a first set of composite materials to form a reference surface. The method includes receiving second geometrical information at the computing device. The second geometrical information is associated with a second set of composite materials associated with a second design. The method includes determining, based on a comparison of the first geometrical information and the second geometrical information, an offset surface relative to the reference surface. The method further includes generating a model of a surface of the second design based on the reference surface and the offset surface.

20 Claims, 15 Drawing Sheets

(56) References Cited

U.S. PATENT DOCUMENTS

| | | | |
|---|---|---|---|
| 5,033,014 A | 7/1991 | Carver et al. | |
| 5,266,021 A | 11/1993 | Jacobson | |
| 5,573,716 A | 11/1996 | Jacobson | |
| 5,984,511 A | 11/1999 | Vasey-Glandon et al. | |
| 6,007,319 A | 12/1999 | Jacobson | |
| 6,041,132 A | 3/2000 | Isaacs et al. | |
| 6,341,261 B1 | 1/2002 | Vasey-Glandon et al. | |
| 6,799,081 B1 | 9/2004 | Hale et al. | |
| 6,813,749 B2 | 11/2004 | Rassaian | |
| 7,010,472 B1* | 3/2006 | Vasey-Glandon | G06F 17/50 700/97 |
| 7,099,725 B2 | 8/2006 | Murrish et al. | |
| 7,321,804 B2 | 1/2008 | Zayic et al. | |
| 7,376,480 B2 | 5/2008 | Hagen et al. | |
| 7,512,527 B2 | 3/2009 | Nagase | |
| 7,536,235 B2 | 5/2009 | Hagen | |
| 7,600,979 B2 | 10/2009 | Steibel et al. | |
| 7,643,970 B2 | 1/2010 | Drumheller et al. | |
| 7,809,454 B2 | 10/2010 | Hu et al. | |
| 7,814,110 B2 | 10/2010 | Anelle et al. | |
| 7,869,982 B2 | 1/2011 | Drumheller et al. | |
| 9,499,203 B1* | 11/2016 | Finley | B62D 21/10 |
| 2005/0025948 A1 | 2/2005 | Johnson et al. | |
| 2007/0063378 A1 | 3/2007 | O'Donoghue | |
| 2007/0106407 A1 | 5/2007 | Drumheller et al. | |
| 2007/0106418 A1 | 5/2007 | Hagen et al. | |
| 2008/0006102 A1 | 1/2008 | Engelbart et al. | |
| 2008/0124512 A1 | 5/2008 | Steibel et al. | |
| 2009/0094010 A1* | 4/2009 | Kothuri | G06T 17/10 703/7 |
| 2009/0102092 A1* | 4/2009 | Westerdahl | B29C 65/7832 264/258 |
| 2009/0271156 A1 | 10/2009 | Kageura | |
| 2009/0312993 A1 | 12/2009 | Drumheller et al. | |
| 2010/0042242 A1* | 2/2010 | Tookey | G06F 17/5095 700/98 |
| 2010/0051167 A1 | 3/2010 | Hunter et al. | |
| 2010/0191360 A1 | 7/2010 | Napadensky et al. | |
| 2010/0204815 A1 | 8/2010 | Murrish et al. | |
| 2011/0029093 A1 | 2/2011 | Bojarski et al. | |
| 2011/0087332 A1 | 4/2011 | Bojarski et al. | |
| 2013/0103359 A1* | 4/2013 | Grandine | G06F 17/5095 703/1 |
| 2015/0076749 A1* | 3/2015 | Schamberg | B29C 41/003 264/555 |
| 2015/0328013 A1* | 11/2015 | Barrall | A61F 2/44 623/17.16 |
| 2017/0241916 A1* | 8/2017 | Leconte | G01N 21/9054 |
| 2017/0347055 A1* | 11/2017 | Dore | G06T 7/90 |
| 2018/0019529 A1* | 1/2018 | Morimoto | H01R 13/41 |
| 2018/0345647 A1* | 12/2018 | Morris | G06F 17/16 |
| 2018/0349531 A1* | 12/2018 | Morris | G06F 17/16 |

OTHER PUBLICATIONS

McNeel Forum, "Unroll 3d model with texture", Jan. 12, 2015, 11 pages Accessible at https://discourse.mcneel.com/t/unroll-3d-model-with-texture/15577.*

Hunten, K.; Klintworth, J.; Pitre, N. and Mack, T., New Standards Based Data Exchange "Bridge" for Design (CAD), Analysis (CAE) and Manufacturing (CAM) of Composite Structures, 1999, MSC 1999 Aerospace User's Conference Proceedings, obtained online at www.mscsoftware.com/support,library/conf/avc99.

Department of Trade and Industry (DTI), "Hybridmat 4: Advances in the Manufacture of 3-D Preform Reinforcement for advanced Structural Composites in Aerospace—A Mission to the USA", Apr. 2006, Report of a DTI Global Watch Mission, obtained online at www.globalwatchservice.com.

Sharma, S.B.; Porat, 1.; Potluri, P. and Atkinson, J., "Manufacturing of Doubly Curved Tubular Composite Structures: Mapping and Weave Modifications", 2002, Journal of Thermoplastic Composite Materials 2002; 15; 209, DOI: 10.1177/0892705702015003448.

* cited by examiner

DELTA OFFSET BASED SURFACE MODELING

FIELD

The present disclosure generally relates to surface modeling.

BACKGROUND

Composite parts are generally formed by laying up layers on a die. The die constrains a shape of one side of the composite part; however, a shape of the other side (e.g., the outer surface) of the composite surface may vary a bit due to how the layers stack. Since the outer surface can vary a bit, generating an accurate representation of an outer surface of an object may be difficult using existing modeling tools.

SUMMARY

In an embodiment, a method includes receiving a reference design at a computing device. The reference design includes first geometrical information associated with a first set of composite materials to form a reference surface. The method includes receiving second geometrical information at the computing device. The second geometrical information is associated with a second set of composite materials associated with a second design. The method includes determining, based on a comparison of the first geometrical information and the second geometrical information, an offset surface relative to the reference surface. The method further includes generating a model of a surface of the second design based on the reference surface and the offset surface.

In another embodiment, a computer-readable storage medium includes instructions that, when executed by a processor, cause the processor to perform various operations. The operations include receiving a reference design that includes first geometrical information associated with a first set of composite materials to form a reference surface. The operations includes receiving second geometrical information associated with a second set of composite materials associated with a second design. The operations includes determining, based on a comparison of the first geometrical information and the second geometrical information, an offset surface relative to the reference surface. The operations further includes generating a model of a surface of the second design based on the reference surface and the offset surface.

In another embodiment, a system is disclosed that includes a processor and a memory communicatively coupled to the processor. The memory stores instructions that are executable by the processor to perform various operations. The operations include receiving a reference design that includes first geometrical information associated with a first set of composite materials to form a reference surface. The operations include receiving second geometrical information associated with a second set of composite materials associated with a second design. The operations include determining, based on a comparison of the first geometrical information and the second geometrical information, an offset surface relative to the reference surface. The operations further include generating a model of a surface of the second design based on the reference surface and the offset surface.

The described features, functions, and advantages may be achieved independently in various embodiments or may be combined in yet other embodiments further details of which can be seen with reference to the following description and drawings.

DETAILED DESCRIPTION

Figure 1:
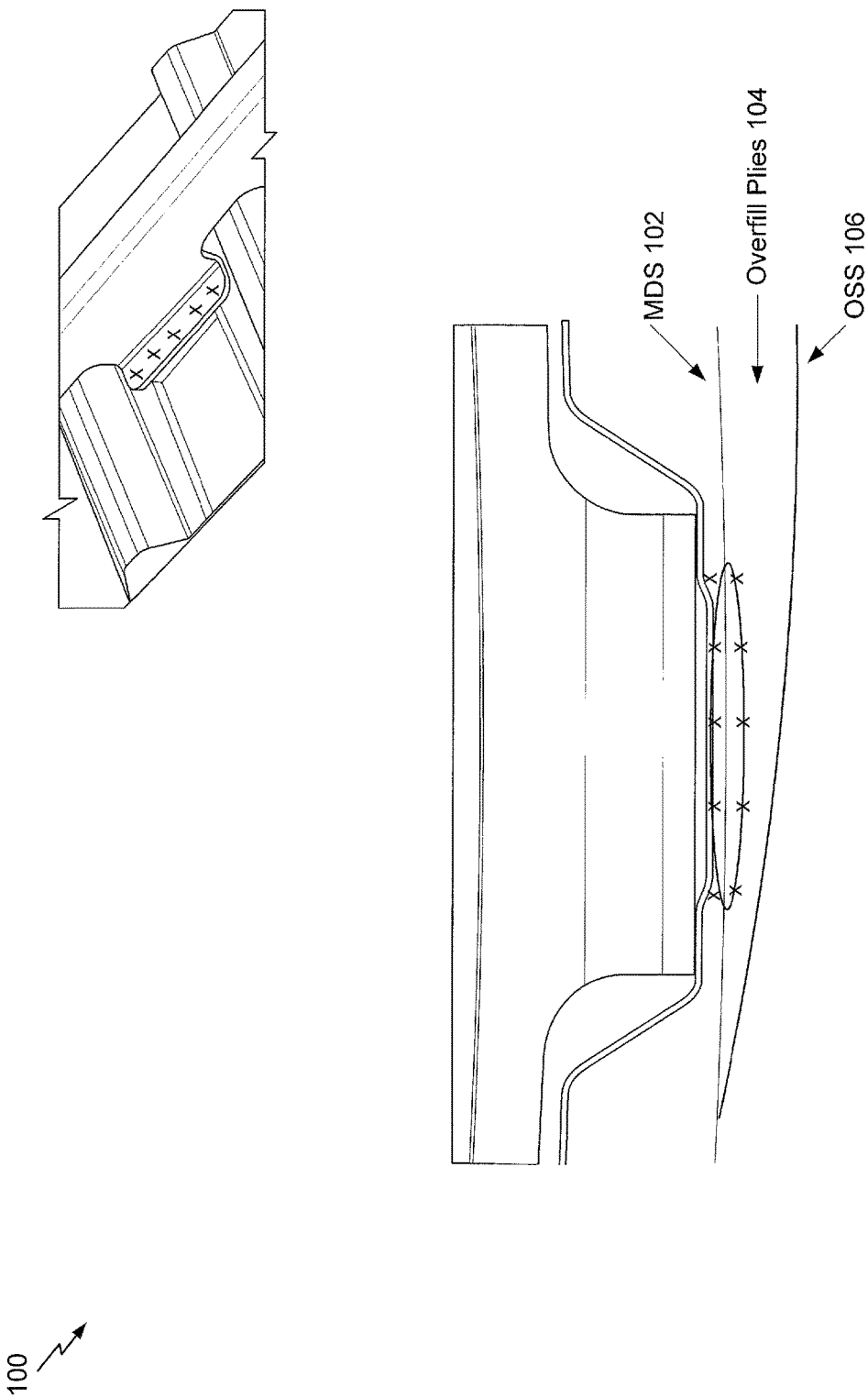
FIG. 1 is a diagram that illustrates an example of a portion of an aircraft skin, with an outer skin surface (OSS) that is modeled based on a reference surface and an offset surface.

In some cases, fuselages for different aircraft designs may use the same internal interface for frames and stringers (referred to herein as an "inner skin assembly" or ISA), in order to have as many commonalities as possible to reduce re-engineering. In the case of a stretched fuselage skin, additional composite plies may be utilized to meet the aircraft's structural requirements. The addition of such composite plies results in a change of shape of an outside of the aircraft's skin. In order to fasten frames and other parts to the aircraft's skin, engineers rely on a precise shape of the final aircraft skin (referred to herein as an "outer skin surface" or OSS). Shapes of ply ramps are particularly important (e.g., for accurate identification of fastener locations). The model of the present disclosure may be used for the purposes of drilling holes for fasteners. It may be desirable for the fasteners to be attached to a fuselage (or other aircraft component) substantially perpendicular to a fuselage skin. By accurately modeling the shape of the ply ramps, holes may be drilled correctly the first time (in most cases), resulting in parts that fit flush to the fuselage with less rework later. Utilizing a modeling tool to calculate the offset from a fixed reference surface (referred to herein as a master datum surface (MDS)) to model the OSS may be insufficient, as such modeling only builds in one direction. Attempting to model in one direction at a time, even if successful, may yield an inaccurate surface.

The present disclosure describes systems and methods of utilizing engineering ply definitions and surface data for calculating a "delta offset" that results from composite laminate buildup in multiple directions. As used herein, the term delta offset refers to an offset in two directions, inward and outward. In the present disclosure, a base model representation may be generated, with surface isoparametric curves ("isoparms") aligned to particular features of a structure (such as fuselage stringers). That is, the coordinate system of the surface aligns with the path of stringers (stiffeners/longerons) such that a traced path of a stringer would stay on a constant line of latitude on the surface. While this may not be possible in all cases, such an approach may improve the quality of a final result and may allow for simpler mathematical calculations. The base model representation may be a three-dimensional representation that may be converted to a two-dimensional representation. Candidate locations for sampling thickness of a part may be calculated, and duplicate locations or otherwise unnecessary locations may be filtered out. The thickness at each of the sample locations may be calculated, and two one-dimensional spline surface representations of the thickness of the part may be calculated, one in each direction from the base model. The two splines may be combined, and a Gaussian convolution function may be applied to the entire surface in order to model the shape of ply ramps in the part.

As described further herein, a computing device may receive a reference design (e.g., a first aircraft design) that includes first geometrical information associated with a first set of composite materials to form reference surface (e.g., a MDS, as illustrated in the example of FIG. 1). As an illustrative, non-limiting example, the reference surface may include a two-dimensional representation of a portion of a fuselage corresponding to a first aircraft design. As described further herein, the two-dimensional representation may be generated by defining a reference seam on the fuselage and unrolling the three-dimensional representation about an axis that is defined by the reference seam. The computing device may receive second geometrical information associated with a second set of composite materials associated with a second design (e.g., a second aircraft design that is different from the first aircraft design). The first geometrical information may be compared to the second geometrical information to determine an offset surface relative to the reference surface (e.g., the MDS). The computing device may generate a model of a surface of the second design based on the reference surface and the offset surface. As illustrated and further described herein with respect to FIG. 1, the model may be utilized to determine a location (or multiple locations) for fastening a component to the surface. For example, the model may be utilized to identify locations on the surface of the second design where fasteners are to be attached. In some cases, at least one of the locations (where fasteners are to be attached) may be associated with a composite material ply ramp.

In some cases, the model that is generated based on the reference surface and the offset surface may be utilized during manufacturing of a vehicle, such as an aircraft. In this case, the reference design corresponds to a first aircraft design, and the second design corresponds to a second aircraft design that is different from the first aircraft design. As an illustrative example, the reference surface may include a two-dimensional representation of a portion of fuselage corresponding to the first aircraft design (as illustrated and further described herein with respect to the examples of FIGS. 2 and 3). In this case, the two-dimensional representation may be generated by defining a reference seam on the fuselage and "unrolling" the three-dimensional representation about an axis that is defined by the reference seam (as illustrated and further described herein with respect to the examples of FIGS. 2 and 3).

In some cases, the first aircraft design may include a first inner skin assembly (ISA), and the second aircraft design may include a second ISA that is the same as the first ISA. To illustrate, the first aircraft design may include a first fuselage skin, and the second aircraft design may include a second fuselage skin that represents a "stretched" fuselage skin compared to the first fuselage skin. As the second fuselage skin is stretched compared to the first fuselage skin, the second fuselage skin may include additional composite plies for structural support (also referred to herein as "overfill plies," as illustrated in the example of FIG. 1).

Figure 4:
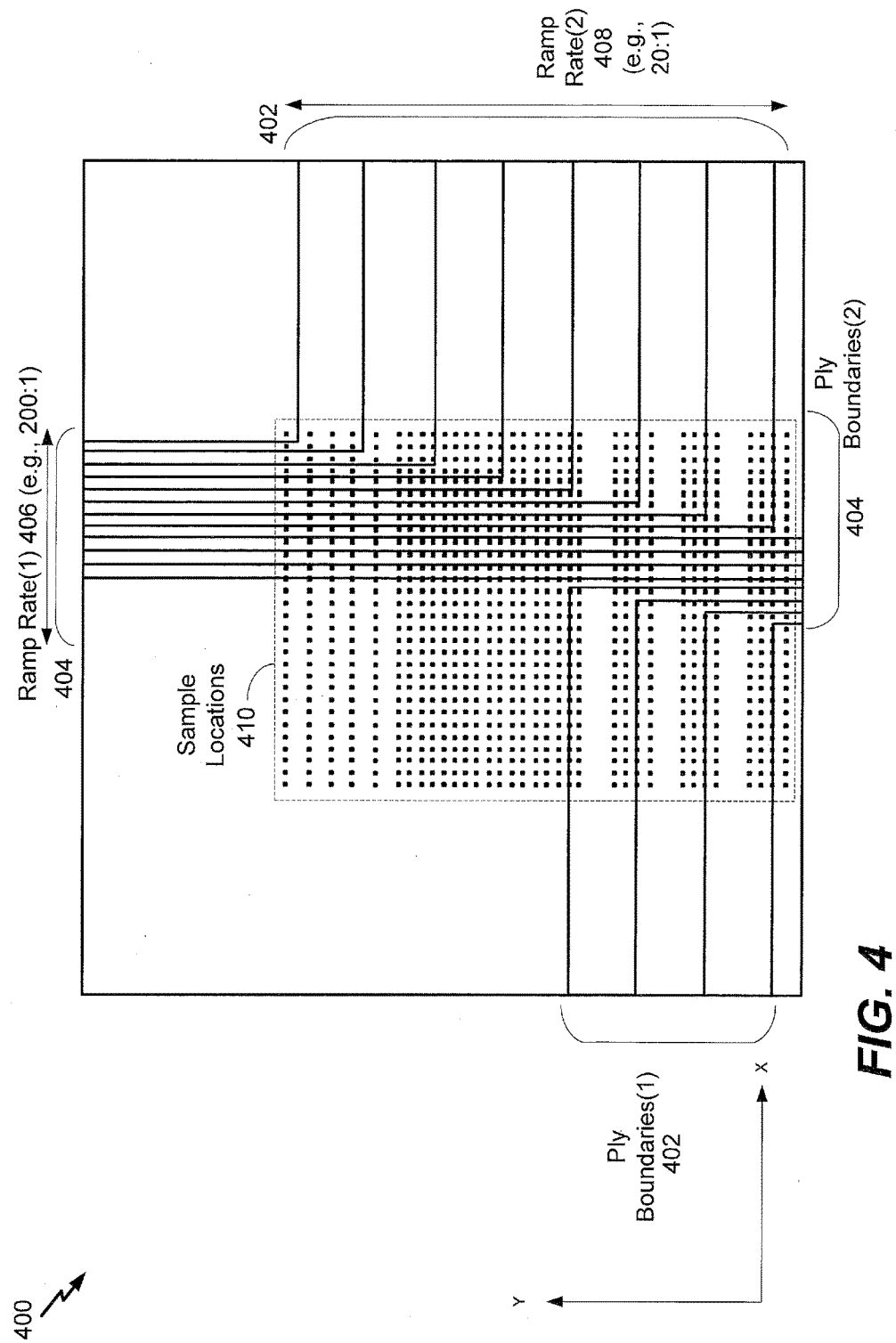
FIG. 4 is a diagram that illustrates an example of a portion of a two-dimensional representation of a surface to show ply boundaries, ramps, and sample locations.

As further described herein with respect to the example illustrated in FIG. 4, a subset of geometrical locations may be selected for comparison. For example, a first subset of geometrical locations may be selected from the first geometrical information, and a second subset of geometrical locations may be selected from the second geometrical locations. The first set of geometrical locations may be compared to the second set of geometrical locations to determine the offset surface relative to the reference surface. As illustrated and further described herein with respect to the example of FIG. 4, the first subset of geometrical locations may be associated with a first plurality of composite material ply boundaries, and the second subset of geometrical locations may be associated with a second plurality of composite material ply boundaries. As illustrated and further described herein with respect to FIGS. 8 and 9, the offset surface may include ply ramps, and one or more convolution operations may be performed to "smooth" the ply ramps in the model.

Figure 5:
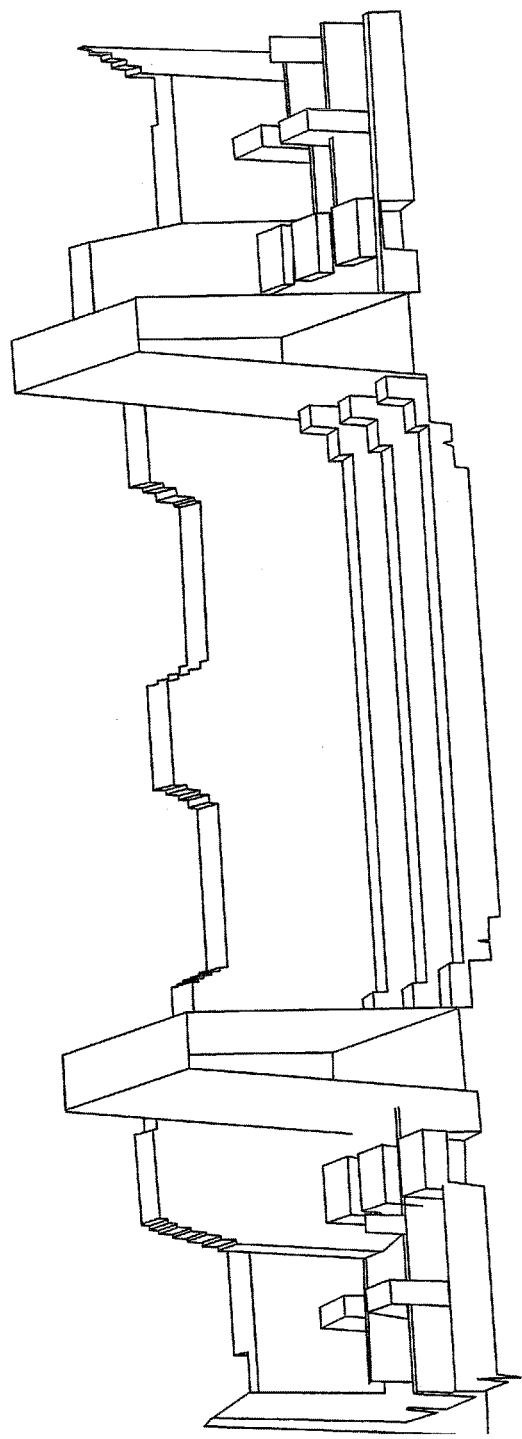
FIG. 5 is a diagram that illustrates an example of a spline surface that is fit through sampled heights for positive plies.
Figure 6:
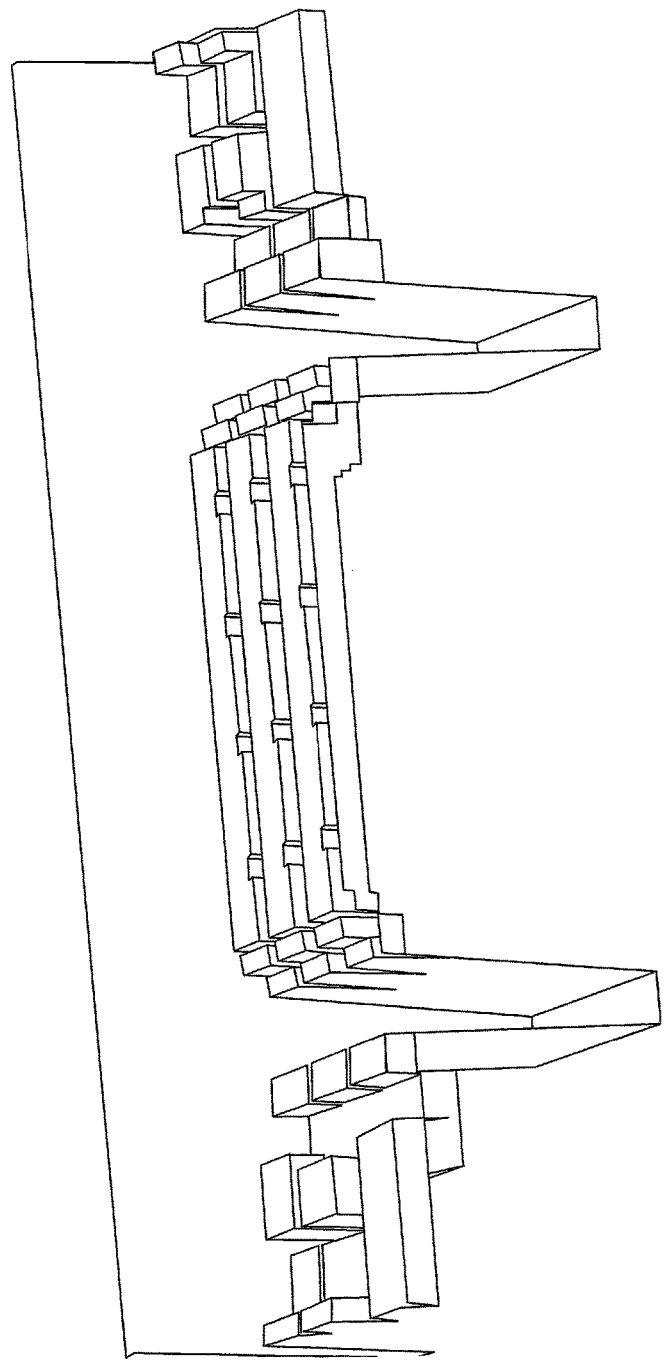
FIG. 6 is a diagram that illustrates an example of a spline surface that is fit through sampled heights for negative plies.
Figure 7:
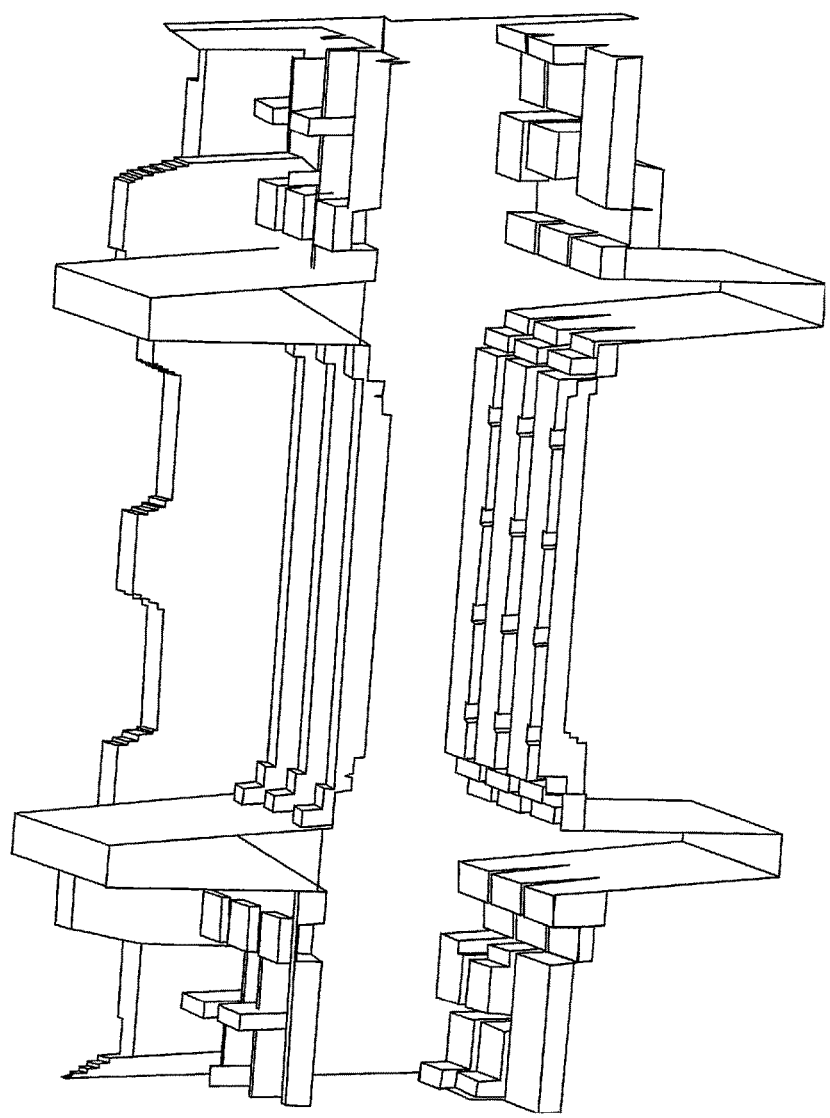
FIG. 7 is a diagram that illustrates the spline surfaces of FIGS. 5 and 6 for comparison purposes.

As described further herein, the first set of composite materials may include a first set of OSS plies and a first set of ISA plies. The second set of composite materials may include a second set of OSS plies and a second set of ISA plies. For comparison purposes, the first set of OSS plies and the second set of OSS plies may be represented as positive numerical values (as shown in the example of FIG. 5). The first set of ISA plies and the second set of ISA plies may be represented as negative numerical values (as shown in the example of FIG. 6). As an illustrative example of values for comparison, the positive numerical values associated with the OSS plies are illustrated at the top of FIG. 7, while the negative numerical values associated with the ISA plies are illustrated at the bottom of FIG. 7.

Referring to FIG. 1, a diagram 100 illustrates an example of a portion of an aircraft skin, with a model of an outer skin surface (OSS) that is generated based on a reference surface and an offset surface.

FIG. 1 illustrates a particular embodiment in which a master datum surface (MDS) 102 with the addition of overfill plies 104 results in an outer skin surface (OSS) 106. FIG. 1 further illustrates that the model of the present disclosure may be used for the purposes of identifying locations (identified by the "X" reference characters in FIG. 1) for drilling holes for fasteners. It may be desirable for the fasteners to be attached to a fuselage (or other aircraft component) substantially perpendicular to a fuselage skin. By accurately modeling the shape of the ply ramps, holes may be drilled correctly the first time (in most cases), resulting in parts that fit flush to the fuselage with less rework later.

As described further herein, an example of a modeling process is described that enables determining OSS features of a second design based on a prior design (e.g., a first design). The modeling process includes fitting a single spline to MDS surface geometry, projecting composite ply geometry to the surface, selecting particular locations along the single spline for sampling, and sampling at the selected locations. The method works from a reference surface (e.g., the MDS based on the first design) and estimates (based on sampling a count of plies at various locations) a number of plies added to or removed from particular portions of the MDS to generate the second design. To determine plies added to or removed from the MDS, an offset surface is determined. To calculate the offset surface, OSS plies are counted as positive thickness, and ISA plies are counted as negative thickness. The process also includes fitting a spline surface through the sampled data to produce an "offset function" F(u,v) to identify a thickness at u,v. A convolution function may be performed on the offset function to smooth ramps, and the offset function may be added to the original MDS spline surface (as further described herein with respect to FIGS. 8-11).

As described further herein, a computing device may receive a reference design that includes first geometrical information associated with a first set of composite materials to form a reference surface. In the example of FIG. 1, the reference design (e.g., a first aircraft design) may correspond to the MDS 102. The computing device may receive second geometrical information associated with a second set of composite materials associated with a second design (e.g., a second aircraft design). The first geometrical information may be compared to the second geometrical information to determine an offset surface relative to the reference surface (e.g., the MDS 102 in the example of FIG. 1). The computing device may generate a model of a surface of the second design based on the reference surface and the offset surface. The model may be utilized during manufacturing of a vehicle (e.g., an aircraft having the second design).

Figure 2:
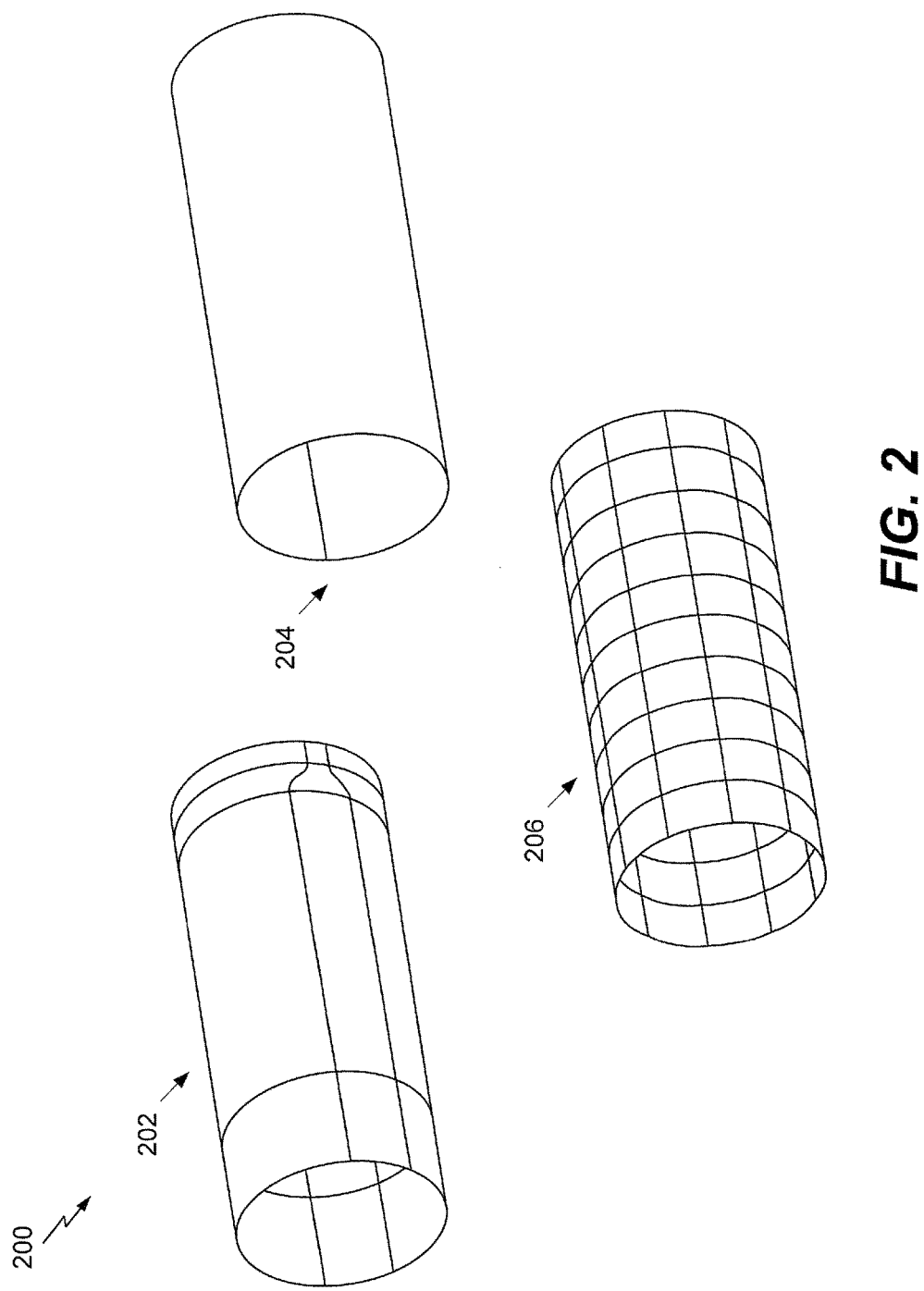
FIG. 2 is a diagram that illustrates an example of a portion of a part that includes composite material plies.

FIG. 2 is a diagram 200 that illustrates an example of a part (e.g., a portion of a fuselage) with composite material plies. FIG. 2 illustrates a three-dimensional representation 202 of a portion of a fuselage corresponding to the MDS 102 illustrated in FIG. 1. FIG. 2 further illustrates the fitting of a single spline surface 204 through the MDS 102 to simplify model calculations. The single spline surface 204 results in a single, uniform parameterization for the part (a "barrel" corresponding to a portion of a fuselage in the example of FIG. 2), as shown at 206.

Figure 3:
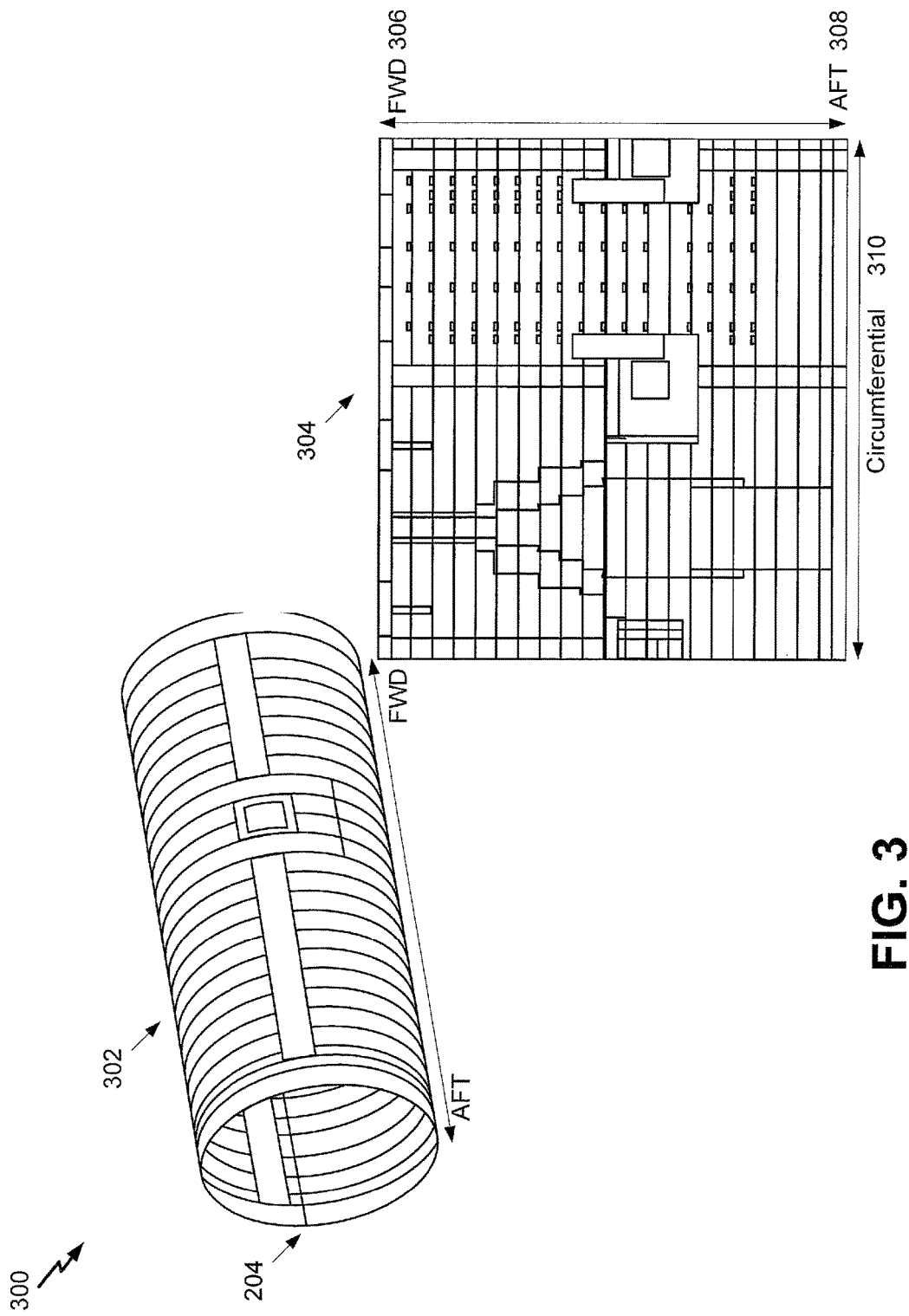
FIG. 3 is a diagram that illustrates an example of ply boundaries projected onto a surface.

FIG. 3 is a diagram 300 that illustrates an example of ply boundaries projected onto a spline surface. FIG. 3 illustrates a three-dimensional representation 302, with ply boundaries projected on to a surface in order to sample in two-dimensional space. The surface, with ply boundaries projected onto the surface, is illustrated as a two-dimensional representation 304. Generating the two-dimensional representation 304 may be considered analogous to unwrapping the barrel at a seam. The two-dimensional representation 304 illustrates the projection of the ply boundaries with respect to a forward direction 306, an aft direction 308, and a circumferential direction 310.

While FIG. 3 illustrates a simplified example of a substantially cylindrical design, it will be appreciated that alternative designs may be used (e.g., for barrels with a non-constant cross-section). As an example, for a section of a fuselage with a non-constant cross-section, isoparametric curves ("isoparms") of a surface may be lined up with centerlines of fuselage stringers. For such barrels with a non-constant cross-section, this causes the two-dimensional shapes to appear rectangular, which may simplify sampling. Ply boundary curves in three dimensions may be converted to ply boundary curves in two dimensions. Such two-dimensional curves are rectangular, despite the shrinking circumference of the non-constant cross-section of the barrel, as a result of the alignments of the isoparms with the stringer centerlines. A barrel with a non-constant cross-section is one example, and the concept applies to wings and other non-constant cross-section surfaces.

FIG. 4 is a diagram 400 illustrating an example of a "zoomed-in" portion of the two-dimensional representation 304 of FIG. 3 in order to show ply boundaries, ply thickness changes (also referred to as "ramps"), and sample locations. For purposes of determining a thickness change (e.g., offset) at a particular sampling location, OSS plies are counted as positive height (as illustrated and further described herein with respect to FIG. 5), and ISA plies are counted as negative height (as illustrated and further described herein with respect to FIG. 6).

In the example of FIG. 4, a first set of ply boundaries 402 are substantially oriented along a first axis (e.g., an X axis), and a second set of ply boundaries 404 are substantially oriented along a second axis (e.g., a Y axis). FIG. 4 illustrates an example in which the first set of ply boundaries 402 have a first ramp rate 406 (e.g., a 200:1 ramp rate), and the second set of ply boundaries 404 have a second ramp rate 408 (e.g., a 20:1 ramp rate). That is, in the example illustrated in FIG. 4, ply boundaries are more closely spaced along the second axis than along the first axis. FIG. 4 further illustrates an example in which a plurality of sample locations 410 are selected to capture locations associated with the ply boundaries 402, 404 as well as locations associated with ply ramps (without sampling too many locations in areas that do not have ramps). The sample locations 410 illustrated in FIG. 4 represent "intelligent" sample locations, where the term intelligent refers to sampling on both sides of a ply boundary to fully capture a change in height in a ramp. However, such sampling may be limited in order to reduce memory utilization.

As an illustrative example of a use of the modeling tool of the present disclosure, a fuselage mandrel (layup tool) may be the same for a first aircraft design and a second aircraft design (with additional plies added to strengthen an elongated fuselage). In this case, the modeling tool may be utilized to determine a delta ply difference between the first aircraft design and the second aircraft design.

FIG. 5 illustrates an example of a spline surface 500 that is fit through the sampled heights for the positive plies. The spline surface 500 illustrated in FIG. 5 represents a height map of the plies of the second aircraft design. Many of these plies already exist in the first aircraft design, but the plies are modeled (as shown in FIG. 5) in order to determine a full thickness of the part.

FIG. 6 illustrates an example of a spline surface 600 that is fit through the sampled heights for the negative plies. The spline surface 600 illustrated in FIG. 6 represents a height map of only the first aircraft design. To determine the delta offset between the first aircraft design and the second aircraft design, the height map of FIG. 5 is combined with the height map of FIG. 6.

Figure 8:
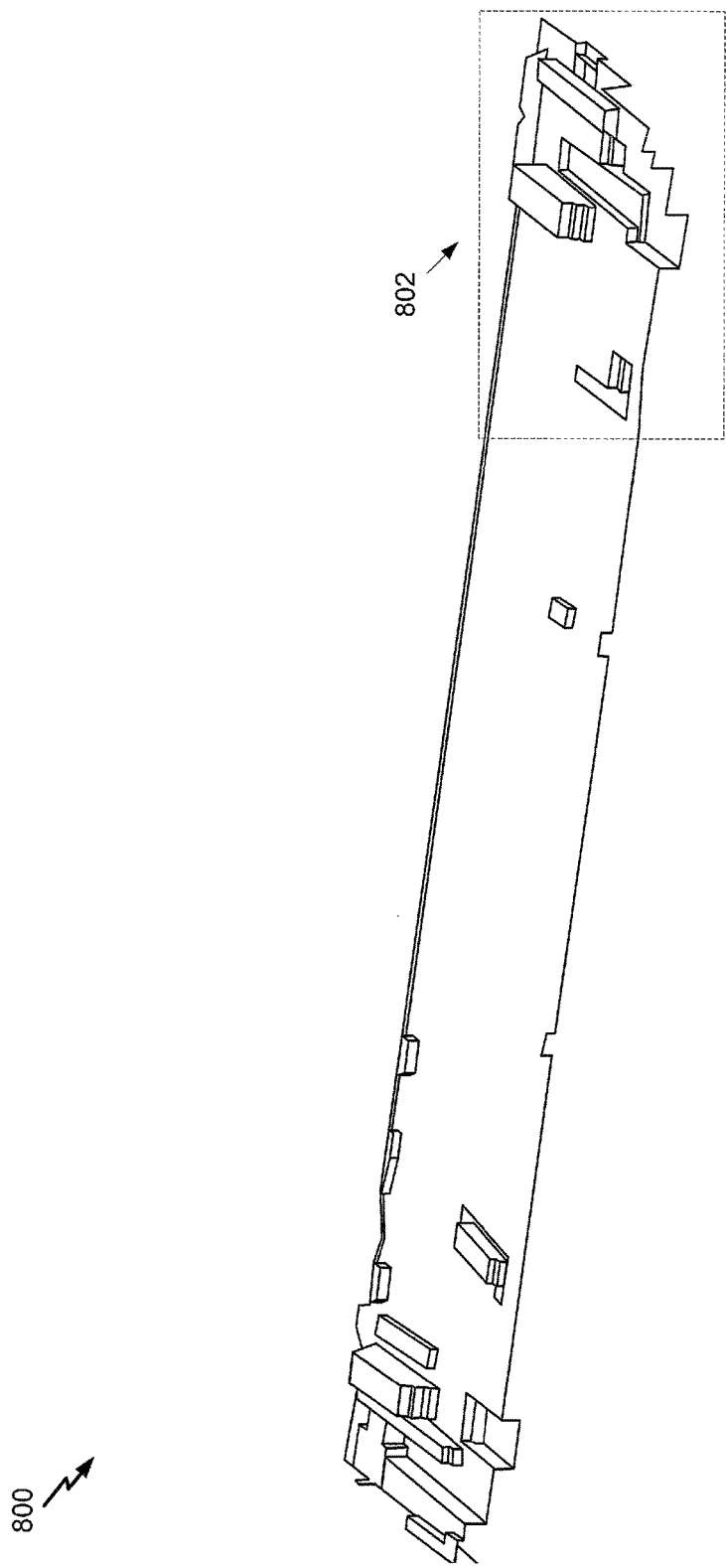
FIG. 8 is a diagram that illustrates an example of a delta spline surface that is determined based on the two spline surfaces of FIG. 7.

FIG. 7 illustrates the result of combining the spline surface 500 of FIG. 5 (the OSS plies) and the spline surface 600 of FIG. 6 (the ISA plies), and FIG. 8 illustrates that adding the spline surface 500 of FIG. 5 and the spline surface 600 of FIG. 6 together results in a delta offset spline 800. FIG. 8 illustrates thicker locations where additional plies were added in the second aircraft design (for additional strength) and thinner locations where ply designers determined that plies could be removed in the second aircraft design.

FIG. 8 illustrates that the delta offset spline 800 is flat in most places associated with added ply layers in the second design with respect to the MDS, but there is an increase in height in some places and a decrease in height in other places associated with removed ply layers in the second design with respect to the MDS. The delta offset spline 800 has sharp steps corresponding to changes in numbers of plies at various locations. In an aircraft as-built composite ply ramps generally do not have steps. As such, the sharp steps in the portion 802 of the delta offset spline 800 may be smoothed in the model (as shown in FIG. 9).

Figure 9:
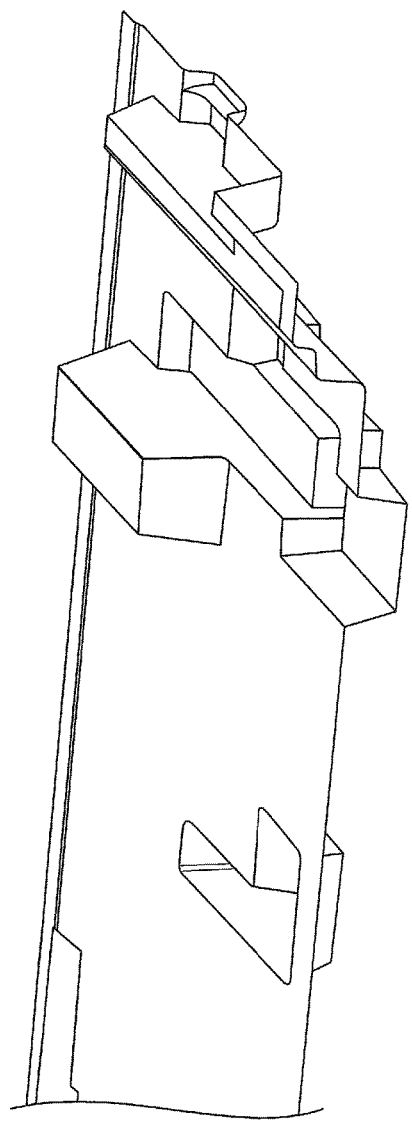
FIG. 9 is a diagram that illustrates an example of ramp smoothing in a portion of the delta offset spline of FIG. 8.

FIG. 9 illustrates that the ply ramps illustrated in the portion 802 of the delta offset spline 800 of FIG. 8 may be smoothed in order to more accurately represent ply ramps in an aircraft as-built. For example, a convolution algorithm may be utilized. An iterative approach may be utilized to identify parameters that most accurately represent ply ramps in an as-built aircraft. In some cases, empirical data may be utilized to confirm that the identified parameters are appropriate and/or to further refine the parameters.

Figure 10:
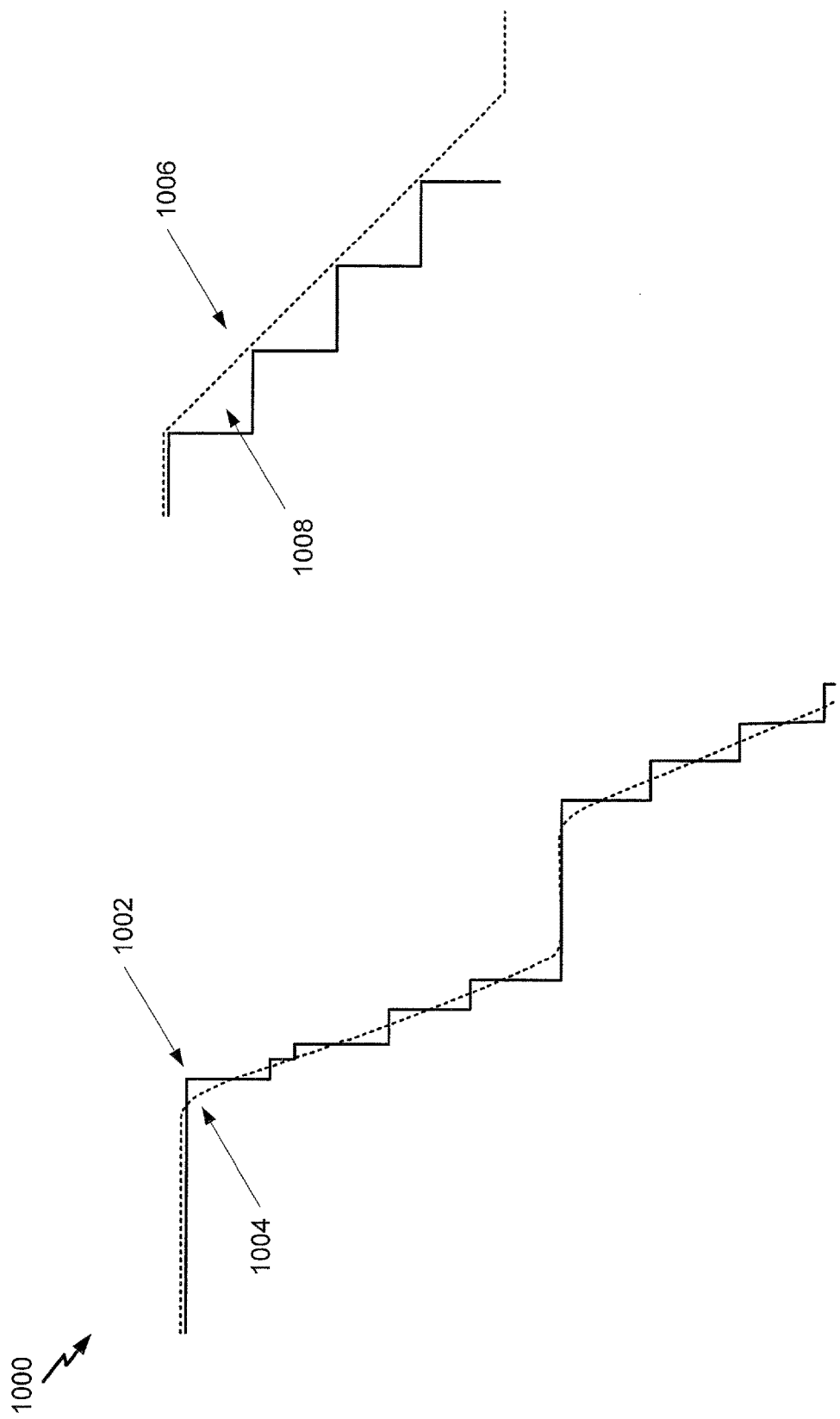
FIG. 10 is a diagram that illustrates an example of an approach to preserve mass by convolving a surface.

FIG. 10 is a diagram 1000 that illustrates an approach to preserve mass by convolving a surface. FIG. 10 illustrates ply ramps without convolution 1002 and ply ramps with convolution 1004. Mass preserving smoothing of ply ramps corresponds to smoothing that utilizes an average of the thickness of the ramp around the point that is being smoothed. FIG. 10 also illustrates a "draping" approach 1006 (analogous to draping a sheet over the top of stair steps) resulting in "voids" 1008 between the ply ramps with convolution 1004 and the ply ramps without convolution 1002. That is, additional thickness is modeled where there is no actual material. As such, utilizing the average throughout the ply ramp allows for a more accurate model of the real thickness that would occur when the part is vacuum-compressed and heated. While other manufacturing processes may utilize the "draping" approach 1006, the smoothing approach may be appropriate for modeling a fuselage barrel.

While not shown in the example of FIG. 10, a convolution kernel value (for application to the ply ramps without convolution 1002) may be selected based on an OSS ramp ratio value (to generate the ply ramps with convolution 1004). In a particular embodiment, the convolution kernel value may be twice the OSS ramp ratio value. As an example, for a 100:1 OSS ramp ratio value, a 200:1 convolution kernel value may be selected. As another example, for a 200:1 OSS ramp ratio value, a 400:1 convolution kernel value may be selected. As a further example, for a 400:1 OSS ramp ratio value, a 800:1 convolution kernel value may be selected.

Figure 11:
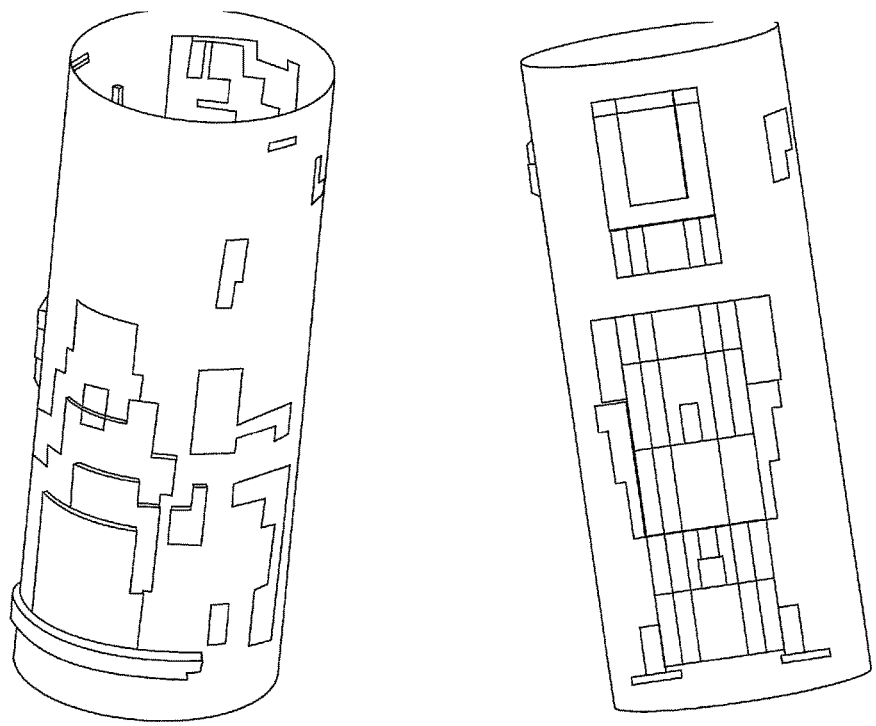
FIG. 11 is a diagram that illustrates examples of three-dimensional representations of a final offset surface.

FIG. 11 is a diagram 1100 to illustrate three-dimensional representations of notional data (delta offset spline data) where ply thickness is multiplied by ten for visualization purposes. The three-dimensional representations show that the thickness surface may be added to the MDS in order to determine a final offset surface, the OSS. Thus, FIG. 11 illustrates an example representation of a model of a surface of a second design (e.g., a second aircraft design) that is generated using a first design (e.g., the MDS 102 of FIG. 1) as a reference surface.

Figure 12:
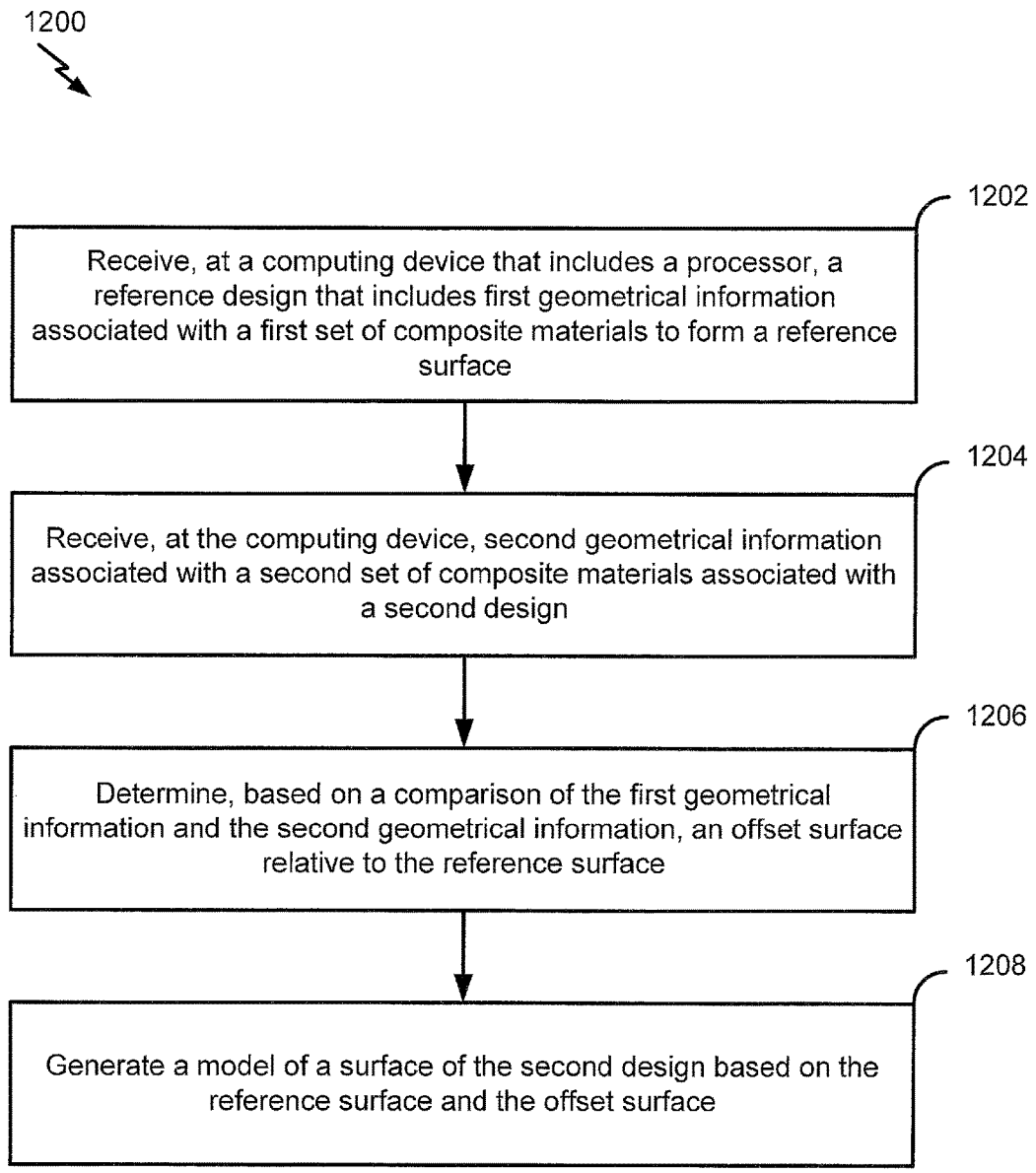
FIG. 12 is a flowchart depicting a particular embodiment of a method of generating a model of a surface of a second design based on a reference surface and an offset surface.

FIG. 12 is a flowchart depicting an exemplary embodiment of a method 1200 of generating a model of a surface of a second design based on a reference surface and an offset surface.

The method 1200 includes receiving, at a computing device, a reference design, at 1202. The reference design (e.g., a first aircraft design) includes first geometrical information associated with a first set of composite materials to form a reference surface. For example, referring to FIG. 1, the reference design may correspond to the MDS 102, and first geometrical information associated with a first set of composite materials associated with the MDS 102 may be retrieved from a memory.

The method 1200 includes receiving, at the computing device, second geometrical information, at 1204. The second geometrical information is associated with a second set of composite materials associated with a second design (e.g., a second aircraft design that is different from the first aircraft design).

The method 1200 includes determining, based on a comparison of the first geometrical information and the second geometrical information, an offset surface relative to the reference surface, at 1206. For example, referring to FIG. 7, the first geometrical information may be compared to the second geometrical information to determine an offset surface relative to the reference surface (as shown in FIG. 8).

The method 1200 includes generating a model of a surface of the second design based on the reference surface and the offset surface, at 1208. For example, FIG. 11 depicts an illustrative example of a model of a surface of the second design that is generated based on the reference surface and the offset surface.

Thus, FIG. 12 illustrates an example of a method of generating a model of a surface of a second design based on a reference surface and an offset surface. As described further herein, the model of the surface of the second design may correspond to a model of a second aircraft design that is generated using a first aircraft design as a reference surface.

Figure 13:
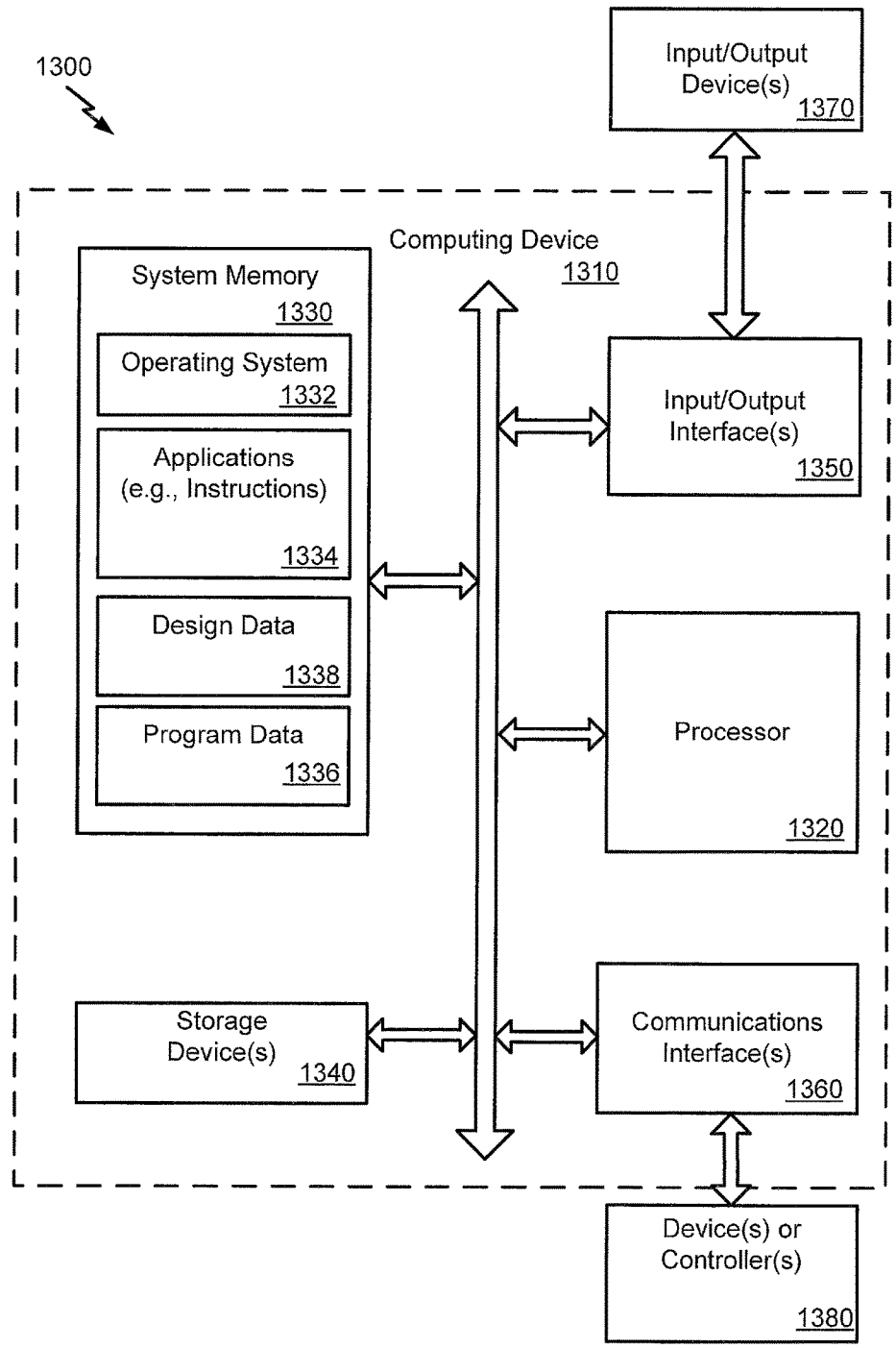
FIG. 13 is an illustration of a block diagram of a computing environment including a general purpose computing device configured to support embodiments of computer-implemented methods and computer-executable program instructions (or code) according to the present disclosure.

FIG. 13 is an illustration of a block diagram of a computing environment 1300 including a general purpose computing device 1310 configured to support embodiments of computer-implemented methods and computer-executable program instructions (or code) according to the present disclosure. For example, the computing device 1310, or portions thereof, may execute instructions to perform the operations described herein with respect to the method 1200 of FIG. 12. The computing device 1310, or portions thereof, may further execute instructions according to any of the methods described herein.

The computing device 1310 may include a processor 1320. The processor 1320 may communicate with the system memory 1330, one or more storage devices 1340, one or more input/output interfaces 1350, one or more communications interfaces 1360, or a combination thereof. The system memory 1330 may include volatile memory devices (e.g., random access memory (RAM) devices), nonvolatile memory devices (e.g., read-only memory (ROM) devices, programmable read-only memory, and flash memory), or both. The system memory 1330 may include an operating system 1332, which may include a basic/input output system for booting the computing device 1310 as well as a full operating system to enable the computing device 1310 to interact with users, other programs, and other devices. The system memory 1330 may include one or more applications 1334 which may be executable by the processor 1320 and system data 1336.

As an example, the one or more applications 1334 may include instructions executable by the processor 1320 to receive a reference design that includes first geometrical information associated with a first set of composite materials to form a reference surface. The one or more applications 1334 may further include instructions executable by the processor 1320 to receive second geometrical information associated with a second set of composite materials associated with a second design. The one or more applications 1334 may further include instructions executable by the processor 1320 to determine, based on a comparison of the first geometrical information and the second geometrical information, an offset surface relative to the reference surface. In a particular embodiment, the reference design corresponds to a first aircraft design, and the second design corresponds to a second aircraft design that is different from the first aircraft design. FIG. 13 illustrates that, in some case, design data 1338 may be stored in the system memory 1330.

The one or more applications 1334 may further include instructions executable by the processor 1320 to generate a model of a surface of the second design based on the reference surface and the offset surface. The model may be utilized during manufacturing of an aircraft having the second aircraft design, as described further herein with respect to FIGS. 14 and 15. In some cases, the one or more applications 1334 may further include instructions executable by the processor 1320 to identify, based on the model, locations on the surface of the second design where fasteners are to be attached (e.g., locations associated with composite material ply ramps).

The processor 1320 may also communicate with one or more storage devices 1340. For example, the one or more storage devices 1340 may include nonvolatile storage devices, such as magnetic disks, optical disks, or flash memory devices. The storage devices 1340 may include both removable and non-removable memory devices. The storage devices 1340 may be configured to store an operating system, images of operating systems, applications, and program data. In a particular embodiment, the memory 1330, the storage devices 1340, or both, include tangible computer-readable media.

The processor 1320 may also communicate with one or more input/output interfaces 1350 that enable the computing device 1310 to communicate with one or more input/output devices 1370 to facilitate user interaction. The processor 1320 may detect interaction events based on user input received via the input/output interfaces 1350. Additionally, the processor 1320 may send a display to a display device via the input/output interfaces 1350. The processor 1320 may communicate with devices or controllers 1380 via the one or more communications interfaces 1360.

Figure 14:
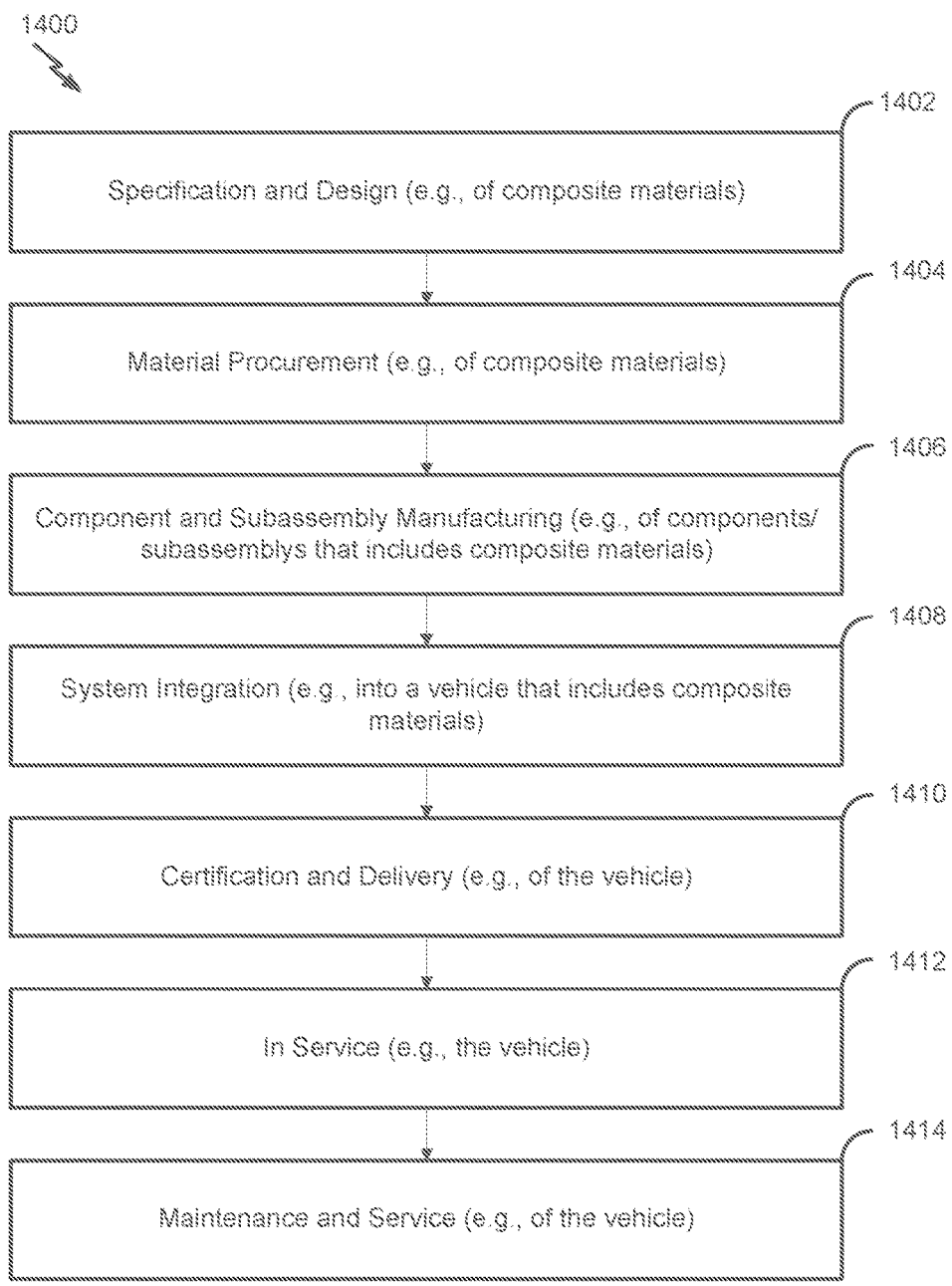
FIG. 14 is a flow diagram of aircraft production and service methodology.
Figure 15:
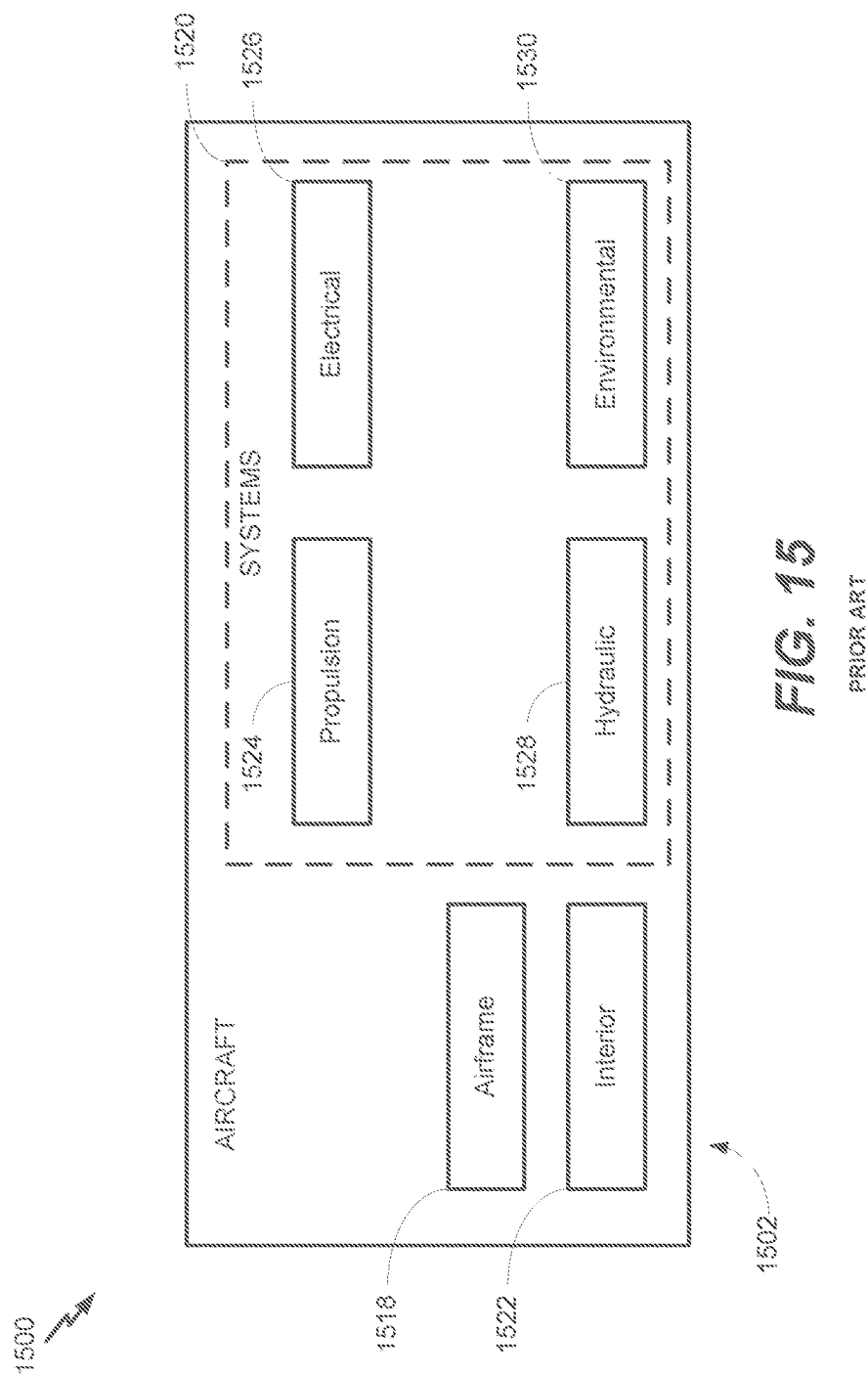
FIG. 15 is a block diagram of an aircraft.

Embodiments of the disclosure may be described in the context of an aircraft manufacturing and service method 1400 as shown in FIG. 14 and an aircraft 1502 as shown in FIG. 15. During pre-production, exemplary method 1400 may include specification and design 1402 of the aircraft 1502 and material procurement 1504. During production, component and subassembly manufacturing 1406 and system integration 1408 of the aircraft 1502 takes place. Thereafter, the aircraft 1502 may go through certification and delivery 1410 in order to be placed in service 1412. While in service by a customer, the aircraft 1502 is scheduled for routine maintenance and service 1414 (which may also include modification, reconfiguration, refurbishment, and so on).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 1502 produced by exemplary method 1400 may include an airframe 1518 with a plurality of systems 1520 and an interior 1522. Examples of high-level systems 1520 include one or more of a propulsion system 1524, an electrical system 1526, a hydraulic system 1528, and an environmental system 1530. Any number of other systems may be included. Although an aerospace example is shown, the principles of the invention may be applied to other industries, such as the automotive industry.

Apparatus and methods embodied herein may be employed during any one or more of the stages of the production and service method 1400. For example, components or subassemblies corresponding to production process 1406 may be fabricated or manufactured in a manner similar to components or subassemblies produced while the aircraft 1502 is in service. Also, one or more apparatus embodiments, method embodiments (e.g., the method 1200 of FIG. 12), or a combination thereof may be utilized during the production stages 1406 and 1408, for example, by substantially expediting assembly of or reducing the cost of an aircraft 1502. Similarly, one or more of apparatus embodiments, method embodiments (e.g., the method 1200 of FIG. 12), or a combination thereof may be utilized while the aircraft 1502 is in service, for example and without limitation, to maintenance and service 1414.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
    receiving, at a computing device, a reference design that includes first geometrical information associated with a first set of composite materials to form a reference surface;
    receiving, at the computing device, second geometrical information associated with a second set of composite materials associated with a second design;
    determining, based on a comparison of a first height map of the reference design based on the first geometrical information and a second height map of the second design based on the second geometrical information, a delta offset surface relative to the reference surface, wherein the first height map and second height map are determined in different directions from the reference surface; and
    generating a model of a surface of the second design based on the reference surface and the delta offset surface.

2. The method of claim 1, further comprising utilizing the model during manufacturing of a vehicle.

3. The method of claim 2, wherein the vehicle includes an aircraft.

4. The method of claim 1, wherein the reference design corresponds to a first aircraft design, and wherein the second design corresponds to a second aircraft design that is different from the first aircraft design.

5. The method of claim 4, wherein the reference surface includes a two-dimensional representation of a portion of a fuselage corresponding to the first aircraft design, and wherein the two-dimensional representation is generated by defining a reference seam on a three-dimensional representation of the fuselage and unrolling the three-dimensional representation about an axis that is defined by the reference seam.

6. The method of claim 4, wherein the first aircraft design includes a first inner skin assembly, and wherein the second aircraft design includes a second inner skin assembly that is the same as the first inner skin assembly.

7. The method of claim 4, wherein the first aircraft design includes a first fuselage skin, and wherein the second aircraft design includes a second fuselage skin that represents a stretched fuselage skin compared to the first fuselage skin.

8. The method of claim 7, wherein the stretched fuselage skin includes additional composite plies for structural support.

9. The method of claim 1, further comprising:
    selecting a first subset of geometrical locations from the first geometrical information;
    selecting a second subset of geometrical locations from the second geometrical information; and
    comparing the first subset of geometrical locations to the second subset of geometrical locations to determine the delta offset surface relative to the reference surface.

10. The method of claim 9, wherein the first subset of geometrical locations are associated with a first plurality of composite material ply boundaries, and wherein the second subset of geometrical locations are associated with a second plurality of composite material ply boundaries.

11. The method of claim 1, wherein the delta offset surface includes ply ramps, the method further comprising performing one or more convolution operations to smooth the ply ramps in the model.

12. The method of claim 1, wherein the first set of composite materials includes a first set of outer skin surface (OSS) plies and a first set of inner skin assembly (ISA) plies, and wherein the second set of composite materials includes a second set of OSS plies and a second set of ISA plies.

13. The method of claim 12, wherein the first set of OSS plies and the second set of OSS plies are represented as positive numerical values for the comparison, and wherein the first set of ISA plies and the second set of ISA plies are represented as negative numerical values for the comparison.

14. The method of claim 1, further comprising utilizing the model to determine a location for fastening a component to the surface.

15. A non-transitory computer-readable storage medium comprising instructions that, when executed by a processor, cause the processor to perform operations comprising:
    receiving a reference design that includes first geometrical information associated with a first set of composite materials to form a reference surface;
    receiving second geometrical information associated with a second set of composite materials associated with a second design;
    determining, based on a comparison of a first height map of the reference design based on the first geometrical information and a second height map of the second design based on the second geometrical information, a delta offset surface relative to the reference surface, wherein the first height map and second height map are determined in different directions from the reference surface; and
    generating a model of a surface of the second design based on the reference surface and the delta offset surface.

16. The non-transitory computer-readable storage medium of claim 15, wherein the reference design corresponds to a first aircraft design, and wherein the second design corresponds to a second aircraft design that is different from the first aircraft design.

17. The non-transitory computer-readable storage medium of claim 16, wherein the model is utilized during manufacturing of an aircraft having the second aircraft design.

18. A system comprising:
    a processor; and
    a memory communicatively coupled to the processor, the memory storing instructions that are executable by the processor to perform operations comprising:
        receiving a reference design that includes first geometrical information associated with a first set of composite materials to form a reference surface;
        receiving second geometrical information associated with a second set of composite materials associated with a second design;
        determining, based on a comparison of a first height map of the reference design based on the first geometrical information and a second height map of the second design based on the second geometrical information, a delta offset surface relative to the reference surface, wherein the first height map and second height map are determined in different directions from the reference surface; and generating a model of a surface of the second design based on the reference surface and the delta offset surface.

19. The system of claim 18, wherein the operations further include identifying, based on the model, locations on the surface of the second design where fasteners are to be attached.

20. The system of claim 19, wherein at least one of the locations is associated with a composite material ply ramp.

* * * * *